United States Patent [19]

Nakamura

[11] 3,983,963
[45] Oct. 5, 1976

[54] MULTIFACIALLY FORMED PANEL IMPACT ABSORBER

[75] Inventor: Yukinori Nakamura, Yokohama, Japan

[73] Assignee: Nissan Motor Company Limited, Yokohama, Japan

[22] Filed: June 5, 1975

[21] Appl. No.: 584,048

Related U.S. Application Data

[63] Continuation-in-part of Ser. No. 398,329, Sept. 18, 1973, abandoned.

[30] Foreign Application Priority Data

Sept. 22, 1972  Japan .............................. 47-94594

[52] U.S. Cl. .................................. 188/1 C; 74/492; 293/70
[51] Int. Cl.² ........................................... F16F 7/12
[58] Field of Search ...................... 74/492; 188/1 C; 280/106 R; 293/70; 297/386

[56] References Cited
UNITED STATES PATENTS

| 3,412,628 | 11/1968 | De Gain ............................. 188/1 C |
| 3,439,860 | 4/1969 | Wienecke ....................... 206/521 X |

Primary Examiner—Duane A. Reger

[57] ABSTRACT

A sheet formed with a regular series of angularly oriented panels which deforms uniformly in response to an applied force.

22 Claims, 18 Drawing Figures

STEERING GEAR

MULTIFACIALLY FORMED PANEL IMPACT ABSORBER

This application is a continuation-in-part of application Ser. No. 398,329, filed on Sept. 18, 1973 and now abandoned.

The present invention generally relates to an impact absorber, and more particularly to an impact absorber for a vehicle which deforms uniformly in response to an applied force resulting from a collision of the vehicle.

During a collision of a vehicle as is well known, various structural panels of conventional design deform in unpredictable manners, thus causing injury to vehicle occupants. Also, since the deformation of conventional panels varies greatly in magnitude with respect to time during the course of a collision, these panels are poor in impact absorbing ability and allow shocks of considerable magnitude to be transmitted therethrough to the vehicle occupants. Although mechanical systems have been proposed to eliminate these drawbacks, none have proved satisfactory.

It is therefore a primary object of the present invention to provide a new and useful impact absorbing contrivance or impact absorber for a vehicle which can effectively absorb impact energy imparted thereto during a collision of the vehicle.

It is another object of the invention to provide a new and useful impact absorber formed with a regular series of angularly oriented faces which deforms uniformly in response to an applied force.

It is still another object of the invention to provide a new and useful impact absorber which can be manufactured in any desired overall shape such as flat, curved or cylindrical with ease comparable to that of ordinary sheet material.

According to this invention, briefly summarized by way of preferred embodiments thereof, there is provided a new and useful impact absorber formed with a regular series of angularly oriented panels which deforms substantially uniformly in geometry and magnitude in response to an applied force. The absorber may be formed from any rigid structural sheet material having desired properties, i.e., the absorber will deform uniformly, as stated above.

The nature, principle, and details of the present invention, as well as other objects and advantages thereof, will become more apparent from the following detailed description with respect to preferred embodiments of the invention when taken in conjunction with the accompanying drawings, in which like parts are designated by like reference numerals, and in which.

Figure 1A:
FIGS. 1A, 1B and 1C illustrate theoretical characteristic deformation of an ordinary impact absorber and an impact absorber embodying the invention.
Figure 1B:
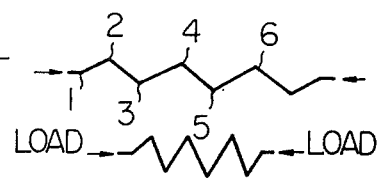
Figure 1C:
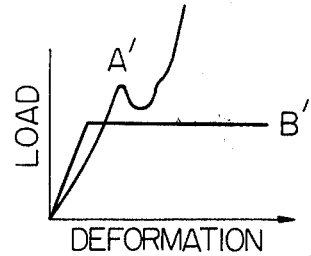

Referring now to the accompanying drawings, there are shown, for illustrative purpose only and not in any way for limitation of the invention, preferred embodiments of a newly developed impact absorber according to the present invention. FIGS. 1A and 1B are respectively theoretical cross sectional views of a conventional impact absorber and an impact absorber of the invention. The absorbers are shown as being in normal (upper figures) and deformed (lower figures) states in response to a force applied as shown. As can be clearly seen, the conventional absorber deforms in a highly irregular manner, but the impact absorber of the invention deforms substantially uniformly. In FIG. 1B, it is observed that there occurs plastic deformation about each panel intersection line designated as (1, 2), (2, 3), (3, 4), (4, 5) and (5, 6), respectively. FIG. 1C shows the theoretical load v.s. deformation relationships for the absorbers. As can be seen, the ordinary absorber (curve A') deforms substantially linearly up to a first peak (no numeral), partially collapses due to elastic instability to a reduced load value (no numeral), and is then substantially structurally collapsed such that subsequent deformation is quite small even in response to a high applied load. A curve B' represents the performance of an impact absorber of the invention. It is seen that there is an initial linear deformation similar to that of the ordinary absorber, but after a point the load (or the reaction of the absorber to the load) is substantially constant although the absorber deforms considerably. This is an ideal state of plastic deformation.

Figure 2:
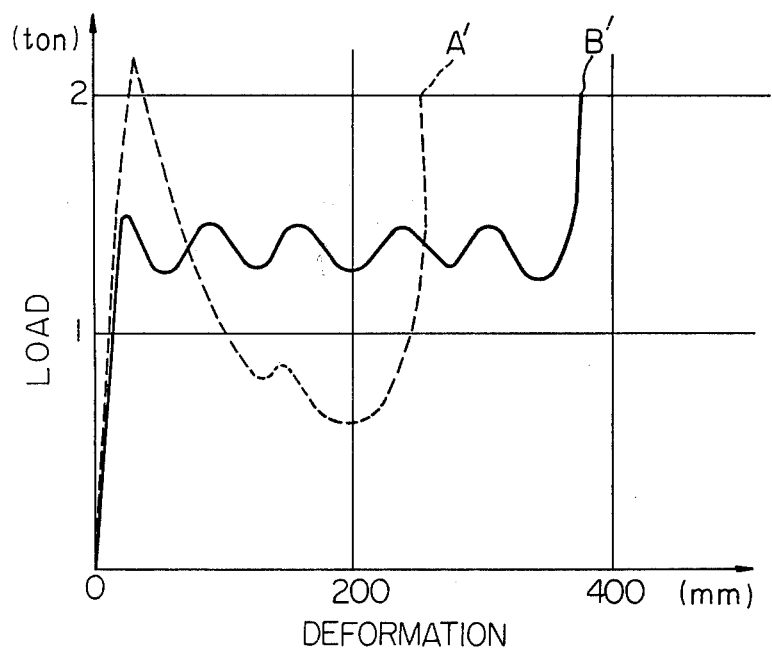
FIG. 2 shows experimentally determined force v.s. deformation relationships for an ordinary impact absorber and an impact absorber embodying the invention.

FIG. 2 shows the actual experimental characteristics of the absorbers, wherein curves A' and B' represent an ordinary and an absorber embodying the invention respectively. Curve A' is substantially linear up to peak as in FIG. 1C, drops to a lower value, and then is substantially vertical indicating total structural collapsation. As is seen, the load (reaction) of the peak of the curve is over twice that at the succeeding low point, indicating that a strong shock can be transmitted through the ordinary absorber to the vehicle occupants. The curve B', however, shows that an absorber of the invention deforms similar to the ordinary absorber, but reaches a peak load value much lower than that of the ordinary one. Then, the curve levels off and is substantially horizontal (with comparatively low level oscillations about the constant load value) until a point is reached in which the absorber is substantially collapsed and deforms very little in response to increased load. As is seen, the absorber of the invention (curve B') deforms about 105 times as much as the ordinary absorber (curve A'), indicating that it has the capacity to absorb much more impact energy. Also, the horizontal (with low level oscillation) portion of the curve B' shows that the absorber of the invention deforms in a substantially uniform plastic manner, and thus dampens shock loads to a much greater extent than an ordinary absorber in order to prevent shock loads from being transmitted through the absorber to vehicle occupants. Based on these curves, it is clear that an ordinary absorber fails basically due to elastic instability (hence the extremes in the value of loading) whereas the absorber of the invention deforms smoothly in a plastic manner. Re-examination of FIG. 1B will show that the panels of an absorber of the invention are substantially flat, and thus they intersect in regions (lines) of substantially zero radius of curvature. Due to the high stress concentrations in these sharp intersection regions, deformation occurs mainly therein. Thus, the deformation of an absorber of the invention is plastic and uniform. Experiments have also shown that an absorber or a contrivance of the invention deforms uniformly throughout its entire extent.

It will be noticed that the absorber of FIG. 1B has a flat overall shape, and that the angled panels are formed in a regular pattern relative to the flat overall shape. It is also possible within the scope of the invention to provide a contrivance with a curved overall shape having the angled panels formed relative thereto.

Figure 3A:
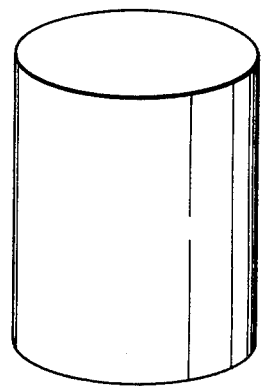
FIGS. 3A and 3B are perspective views of an ordinary cylindrical impact absorber and a cylindrical impact absorber embodying the invention, respectively.
Figure 3B:
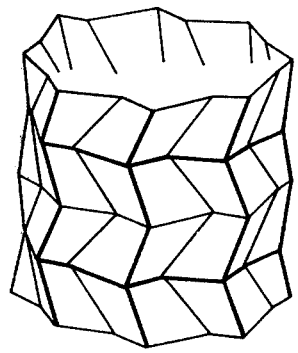

The absorber or contrivance of FIG. 3B is an embodiment of the invention having a cylindrical (closed curved) overall shape as shown in FIG. 3A. This type of configuration is practical for use as a steering wheel column, bumper mount, or similar vehicle component.

Figure 4A:
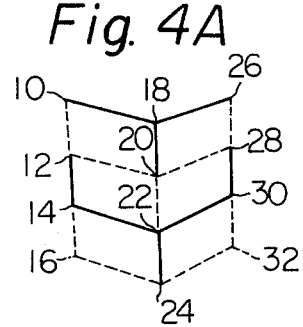
FIGS. 4A through 4D are fragmentary diagrammatic views of a multipanel configuration of an impact absorber of the invention.
Figure 4C:
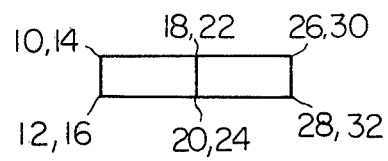
Figure 4B:
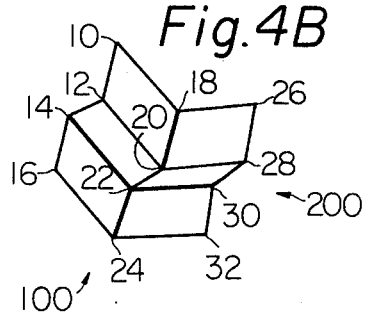
Figure 4D:
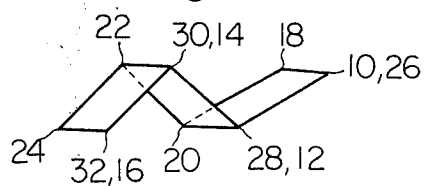

FIGS. 4A to 4B shows a general pattern of formation of flat panels of an absorber embodying the invention. As is seen, the panels form a two-coordinate (shown here as planar) zig-zag pattern. If desired, this two-coordinate pattern may be non-planar, such as in cylindrical coordinates. Viewed in the direction of an arrow 100 in FIG. 4B, lines of panel intersection 10–18, 18–26, 14–22 and 22–30 appear as raised (ridges). Lines 12–20, 20–28, 16–24 and 24–32 appear as depressed (valleys). Viewed in the direction of an arrow 200, a line of panel intersection 18-20-22-24 appears as raised (ridge), and lines 26-28-30-32 and 10-12-14-16 appear as depressed (valleys). It will be noted that each of the flat panels is integrally combined in angularly relationship, other than a right angle relationship, with at least two panels adjacent thereto along respective side edges thereof and providing a continuous joining line between the respective side edges. Accordingly, the panels are combined with each other without any opening thereamong.

Figure 5:
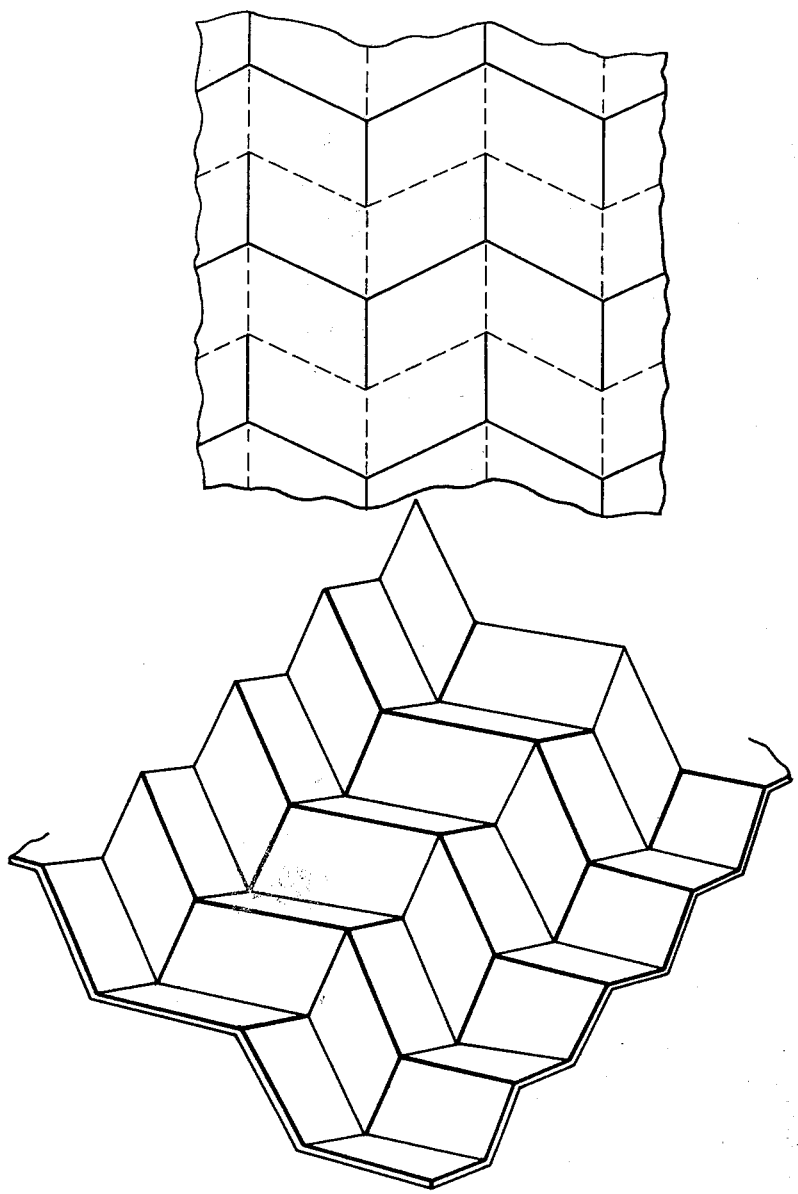
FIGS. 5 through 8 are diagrammatic and perspective views, respectively, showing typical multipanel patterns of impact absorbers of the invention.
Figure 6:
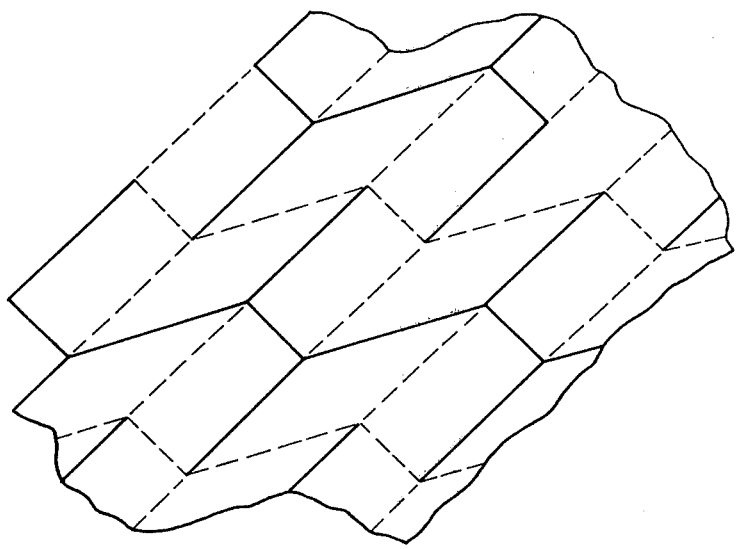
Figure 6:
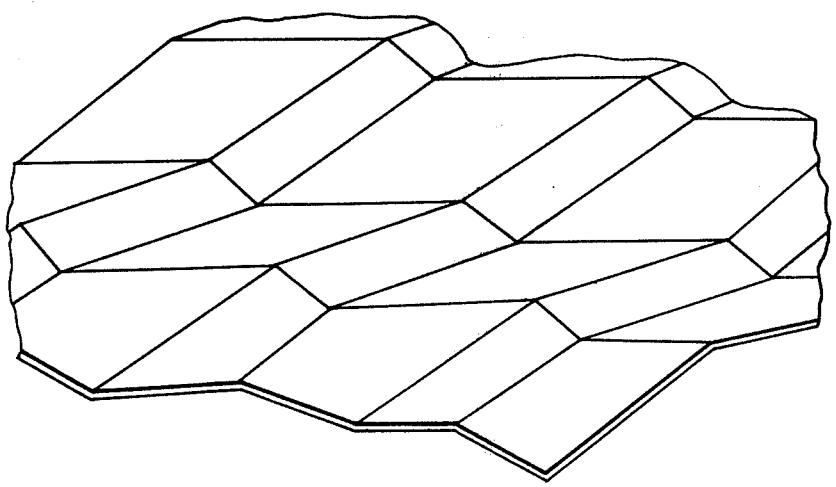

FIG. 5 shows an embodiment of the invention in diagram and perspective in which in the upper (diagrammatic) view, ridges are shown in solid line and valleys in broken line. In this embodiment, the dimensions of all panels are the same, and all panels have a rectangular shape. FIG. 6 is similar to FIG. 5, but in this illustrated embodiment, all panels are rectangular but do not have the same dimensions.

Figure 7:
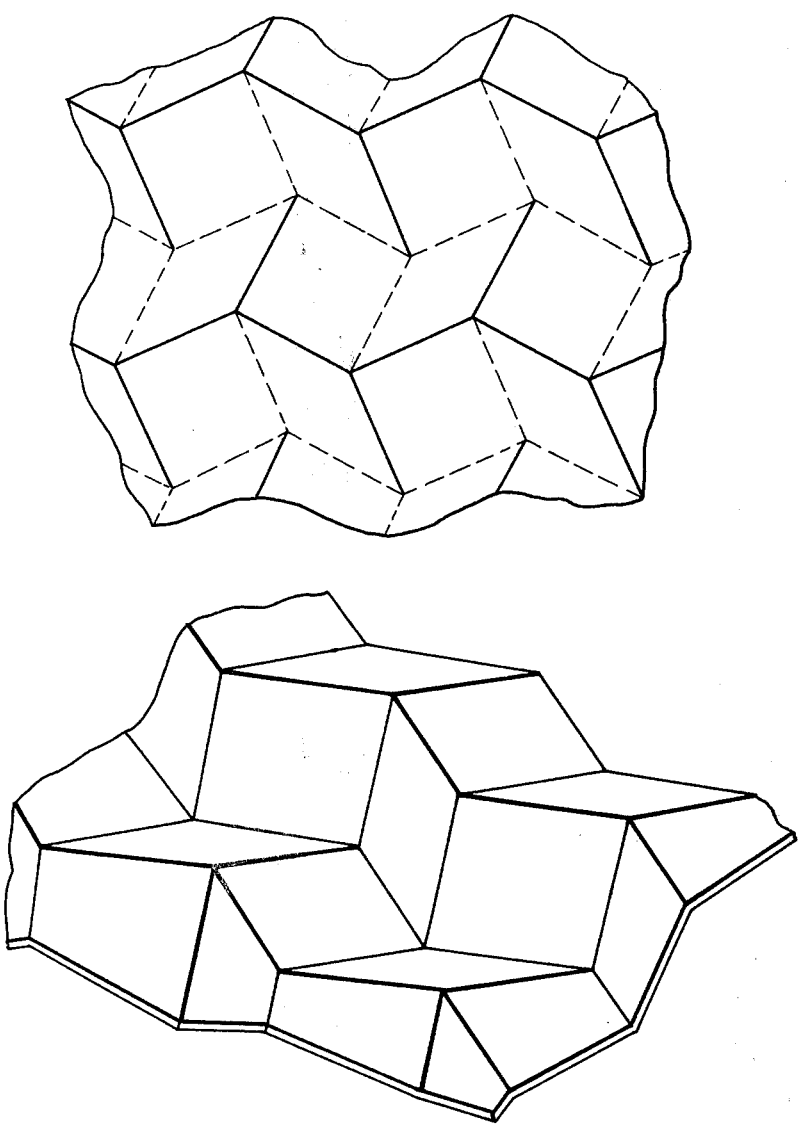
Figure 8:
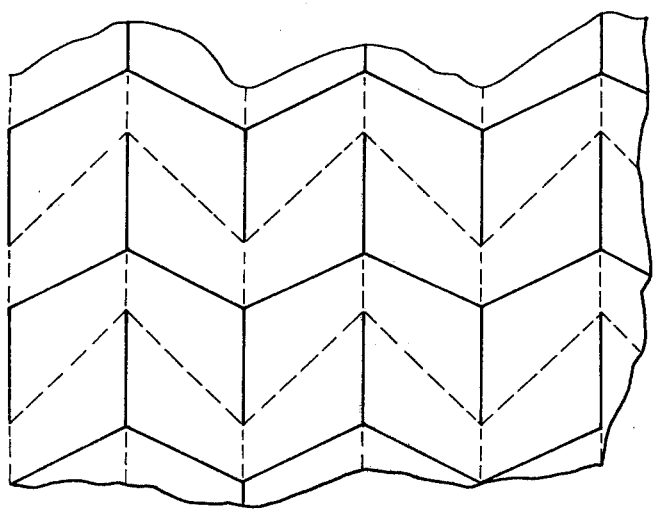
Figure 8:
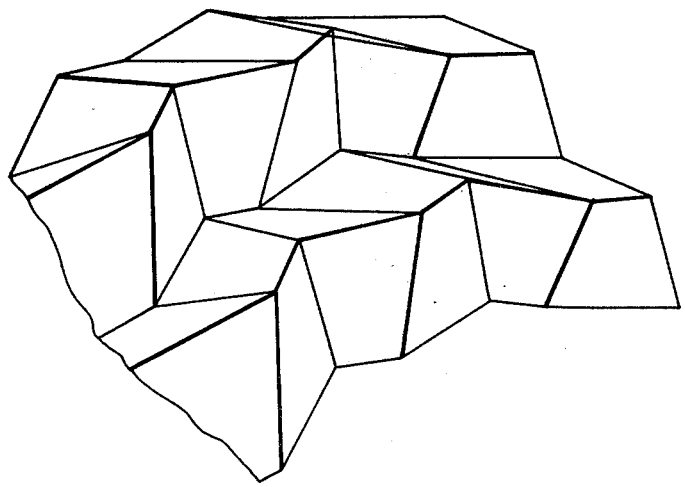

FIG. 7 is similar to FIGS. 5 and 6, but in this illustrated embodiment the panels are in the shape of squares rather than rectangles. In the embodiment of FIG. 8, the panels have the shapes of quadrilaterals with two mutually parallel edges or sides.

It will be noted that a variety of rigid structural sheet materials described in FIGS. 5 to 8, embodying the present invention, are preferably made of metal such as steel for use in the impact absorber, particularly for use in the impact absorber of the vehicle which is subjected to a relatively high impact force. Each of the structural sheet material is formed by only bending one flat metallic sheet along predetermined lines thereof which correspond to the lines of panel intersection. The bending operation may be carried out by pressworking operation. Then the flat metallic sheet is not forced to expand its surface area during the bending process and therefore the surface area of the structural sheet material (after bending) in substantially the same as that of the flat metallic sheet (before bending). The metallic sheet may be made of a non-ferrous metal or a non-ferrous alloy.

Figure 9:
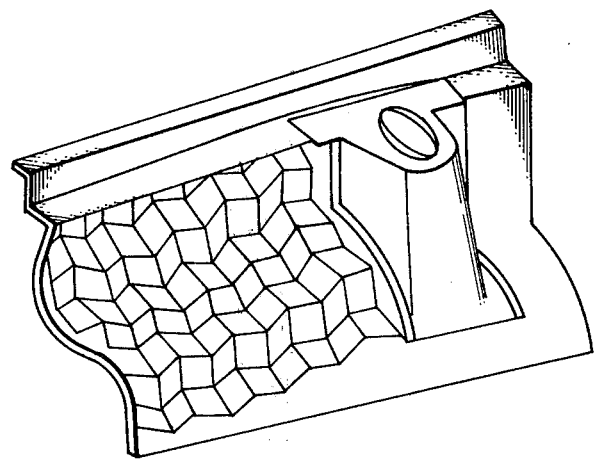
FIGS. 9 through 12 are perspective views of typical practical embodiments of an impact absorber of the invention.
Figure 10:
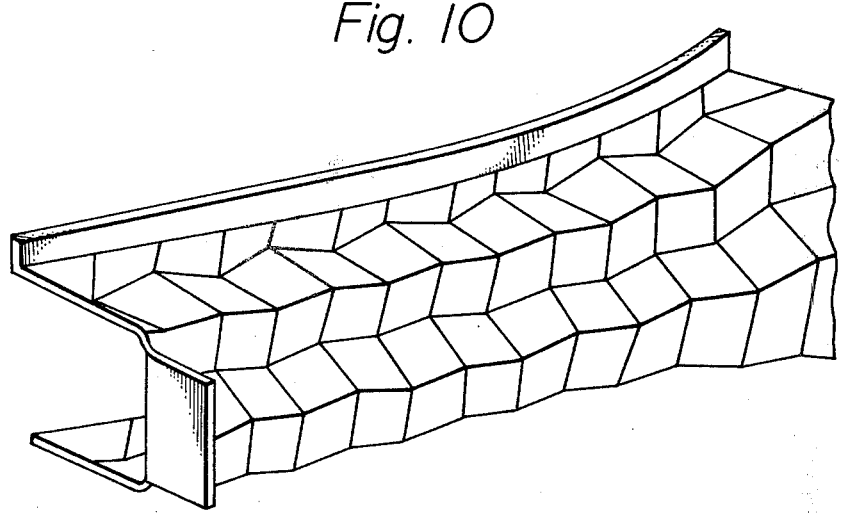

FIGS. 9 and 10 show practical applications of an impact absorbing contrivance of the invention, and denote respectively a hood support member, a front structural member.

Figure 11:
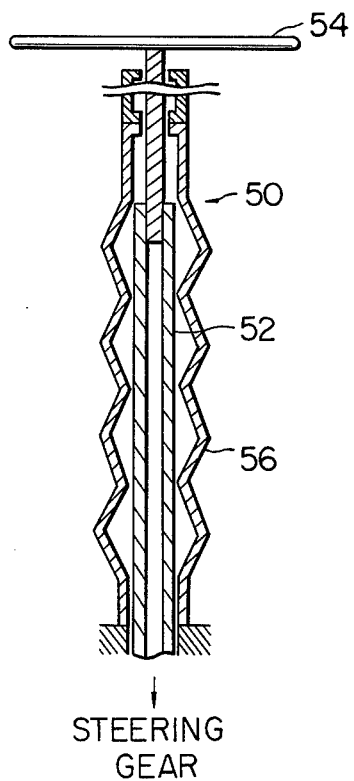

FIG. 11 shows a safety steering column assembly 50 comprising a telescopic steering shaft 52 operatively connected at one end thereof to a steering gear and at the other end to a manual steering instrumentality 54. A tubular energy absorbing member 56 according to the invention is arranged about the telescopic steering shaft 52 in a manner to be operative during telescopic movement of the shaft 52. The shaft 52 is mounted for rotation within the energy absorbing member 56. The tubular energy absorbing member 56 is similar shape to the embodiment illustrated in FIG. 3A.

Figure 12:
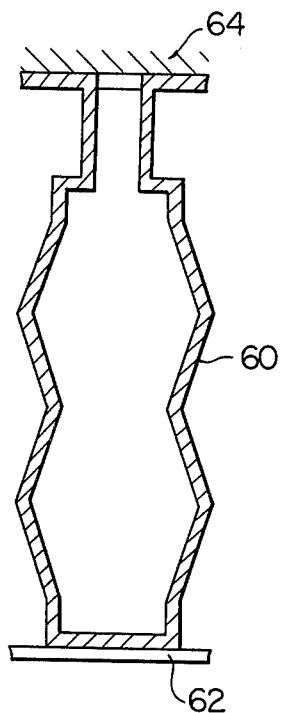

FIG. 12 shows a bumper mount 60 according to the invention which is arranged to connect between a bumper 62 and a body 64 of the vehicle. The bumper mount 60 may be the shape of a tube similar to the embodiment illustrated in FIG. 3A. The bumper mount 60 is collapsed when a high impact force is imparted thereto.

Thus, an impact absorbing contrivance of the invention can be easily manufactured in any desired flat or curved shape, and can uniformly and effectively absorb impact loads imparted thereto during a collision of a vehicle to prevent injury to the vehicle occupants.

What is claimed is:

1. An impact absorber formed from a rigid structural metallic sheet material comprising a regular series of angularly oriented metallic panels, each of said panels having substantially a plane surface and being in the form of quadrilateral, each of said panels being integrally combined in angularly relationship, other than a right angle relationship, with at least two panels adjacent thereto along respective side edges thereof and providing a continuous joining line between the respective side edges, said rigid structural metallic sheet material being formed by only bending one flat metallic rigid sheet along predetermined lines thereof which correspond to said continuous joining lines, the surface area of said rigid structural sheet material being continuous and substantially the same as that of said flat metallic rigid sheet.

2. An impact absorber as claimed in claim 1, in which each of said metallic sheet panels is made of steel.

3. An impact absorber as claimed in claim 1, wherein the angularly oriented panels have at least two mutually parallel side edges.

4. An impact absorber as claimed in claim 1, wherein the angularly oriented panels are oriented in a regular two-coordinate zig-zag pattern.

5. An impact absorber as claimed in claim 3, wherein the angularly oriented panels are oriented in a regular two-coordinate zig-zag pattern.

6. An impact absorber as claimed in claim 1, having an overall planar shape.

7. An impact absorber as claimed in claim 3, having an overall planar shape.

8. An impact absorber as claimed in claim 4, having an overall planar shape.

9. An impact absorber as claimed in claim 5, having an overall planar shape.

10. An impact absorber as claimed in claim 1, having an overall cylindrical shape.

11. An impact absorber as claimed in claim 3, having an overall cylindrical shape.

12. An impact absorber as claimed in claim 4, having an overall cylindrical shape.

13. An impact absorber as claimed in claim 5, having an overall cylindrical shape.

14. An impact absorber as claimed in claim 1, having at least one portion of overall curved shape.

15. An impact absorber as claimed in claim 3, having at least one portion of overall curved shape.

16. An impact absorber as claimed in claim 4, having at least one portion of overall curved shape.

17. An impact absorber as claimed in claim 5, having at least one portion of overall curved shape.

18. A safety steering column of a vehicle having a steering gear comprising, telescopic steering shaft means operatively connect at one end thereof to said steering gear and at the other end thereof to a manual steering instrumentality, a tubular energy absorbing member having a continuous surface area arranged about said shaft means in a manner to be operative during telescopic movement of said shaft means, said shaft means being mounted for rotation within said energy absorbing member, said tubular energy absorbing member comprising a regular series of angularly oriented metallic panels, each of said panels having substantially a plane surface and being in the form of quadrilateral, each of said panels being integrally combined in angularly relationship, other than a right angle relationship, with at least two panels adjacent thereto along respective side edges thereof and providing a continuous joining line between the respective side edges.

19. A safety steering column as claimed in claim 18, in which each of said metallic sheet panels is made of steel.

20. An impact absorbing bumper mount connecting between a bumper and a body of a vehicle, formed from a rigid structural metallic sheet material having a continuous surface area comprising a regular series of angularly oriented metallic panels, each of said panels having substantially a plane surface and being in the form of quadrilateral, each of said panels being integrally combined in angularly relationship, other than a right angle relationship, with at least two panels adjacent thereto along respective side edges thereof and providing a continuous joining line between the respective side edges.

21. An impact absorbing bumper mount as claimed in claim 20, in which each of said metallic sheet panels is made of steel.

22. An impact absorbing bumper mount as claimed in claim 20, in which said rigid structural metallic sheet material is in the form of a tube.

* * * * *